(12) United States Patent
Matthews et al.

(10) Patent No.: US 12,286,080 B2
(45) Date of Patent: Apr. 29, 2025

(54) STORAGE SYSTEM SUITABLE FOR INSTALLATION IN OR ON A VEHICLE

(71) Applicant: Impact Import Group Pty Ltd, Leopold (AU)

(72) Inventors: Giles Frederick Matthews, Balwyn (AU); Antony Angelo Stolfo, Indented Head (AU); Yi Yuan, Reservoir (AU); Jeffrey West, Diamond Creek (AU); David Richard Chapman, Thornbury (AU); Blake Jordan Fuller, Glen Iris (AU); Louis David Mills, St Kilda (AU)

(73) Assignee: IMPACT IMPORT GROUP PTY LTD (AU)

( * ) Notice: Subject to any disclaimer, the term of this patent is extended or adjusted under 35 U.S.C. 154(b) by 594 days.

(21) Appl. No.: 17/677,192

(22) Filed: Feb. 22, 2022

(65) Prior Publication Data
US 2022/0266755 A1 Aug. 25, 2022

(30) Foreign Application Priority Data

Feb. 22, 2021 (AU) ................................ 2021900462

(51) Int. Cl.
*B60R 5/04* (2006.01)
*B60P 7/08* (2006.01)
(Continued)

(52) U.S. Cl.
CPC ............. *B60R 5/04* (2013.01); *B60P 7/0815* (2013.01); *B60P 7/10* (2013.01); *B60Q 3/30* (2017.02);
(Continued)

(58) Field of Classification Search
CPC .. B60R 5/04; B60R 25/00; B60Q 3/30; B60P 7/0815; B60P 7/10
(Continued)

(56) References Cited

U.S. PATENT DOCUMENTS

| | | | | | |
|---|---|---|---|---|---|
| 2,992,056 | A | * | 7/1961 | Thielker | ............... E05B 65/465 312/221 |
| 3,973,814 | A | * | 8/1976 | Entrikin | ............... A47B 88/467 312/333 |

(Continued)

FOREIGN PATENT DOCUMENTS

| | | | |
|---|---|---|---|
| DE | 10201242 | 7/2003 | |
| DE | 10201242 A1 * | 7/2003 | ........... A47B 88/047 |
| DE | 102014119628 | 6/2016 | |

OTHER PUBLICATIONS

European Search Report; Corresponding EP Application No. EP 22157806; May 31, 2022.
(Continued)

*Primary Examiner* — Nathan J Newhouse
*Assistant Examiner* — Lester L Vanterpool
(74) *Attorney, Agent, or Firm* — Squire Patton Boggs (US) LLP

(57) ABSTRACT

A storage system, comprising: a frame, the frame comprising two opposing frame side walls, a frame rear wall, a frame top wall and a frame base, which collectively define a drawer receiving space; the frame having a front opening; a drawer receivable in the drawer receiving space through the front opening; the drawer comprising first and second opposing drawer side walls, a drawer base, a drawer front wall and a drawer rear wall, which collectively define a drawer storage space, the drawer having a top opening for receiving contents into the drawer storage space; a drawer position retainer for releasably retaining the drawer in any one of at least two drawer positions relative to the frame, the (Continued)

at least two drawer positions comprising: a closed position, wherein the drawer is at least substantially received within the frame; and a partially open position, wherein the drawer is partially received within the frame; and an actuator mounted to or adjacent the drawer front wall for manually actuating the drawer position retainer.

16 Claims, 12 Drawing Sheets

(51) Int. Cl.
    *B60P 7/10*     (2006.01)
    *B60Q 3/30*     (2017.01)
    *B60R 25/00*     (2013.01)
    *E05B 65/46*     (2017.01)
    *E05B 73/00*     (2006.01)

(52) U.S. Cl.
    CPC .............. *B60R 25/00* (2013.01); *E05B 65/46* (2013.01); *E05B 73/00* (2013.01)

(58) Field of Classification Search
    USPC .................................. 224/281, 404; 296/37.6
    See application file for complete search history.

(56) References Cited

U.S. PATENT DOCUMENTS

| | | | | |
|---|---|---|---|---|
| 4,274,568 | A | | 6/1981 | Bott |
| 4,573,731 | A | * | 3/1986 | Knaack ................... B60R 11/06 |
| | | | | 224/404 |
| 4,705,326 | A | * | 11/1987 | Craig .................... E05B 65/468 |
| | | | | 312/216 |
| 5,192,123 | A | * | 3/1993 | Wallin ................... A47B 96/00 |
| | | | | 248/500 |
| 5,257,860 | A | | 11/1993 | Slivon |
| 7,083,219 | B1 | * | 8/2006 | Gregory .................. B60P 1/003 |
| | | | | 414/522 |
| 7,219,941 | B1 | * | 5/2007 | San Paolo ................. B60R 9/00 |
| | | | | 224/404 |
| 8,317,251 | B2 | * | 11/2012 | Nelson ..................... B60R 5/042 |
| | | | | 135/88.13 |
| 9,321,402 | B2 | * | 4/2016 | Nedelman ............... B60R 11/06 |
| 10,974,656 | B2 | * | 4/2021 | Keck ....................... B60R 9/065 |
| 11,292,532 | B1 | * | 4/2022 | Heinzelman ............ B60R 5/041 |
| 11,584,310 | B2 | * | 2/2023 | Cooper ..................... B60P 3/34 |
| 11,925,262 | B2 | * | 3/2024 | Cooper ................. A47B 88/477 |
| 2002/0014505 | A1 | | 2/2002 | Lance et al. |
| 2004/0050890 | A1 | * | 3/2004 | Johnson ................. A63B 55/61 |
| | | | | 224/404 |
| 2006/0097021 | A1 | * | 5/2006 | Stanton ..................... B60R 5/04 |
| | | | | 224/404 |
| 2006/0284437 | A1 | | 12/2006 | Collins et al. |
| 2007/0158968 | A1 | * | 7/2007 | Chandler .................. B60P 3/14 |
| | | | | 296/37.6 |
| 2007/0246495 | A1 | * | 10/2007 | Hague ..................... B60R 7/087 |
| | | | | 224/281 |
| 2008/0191506 | A1 | * | 8/2008 | Huotari .................. A47B 37/00 |
| | | | | 224/404 |
| 2014/0140797 | A1 | * | 5/2014 | Howe ................... B60P 1/6418 |
| | | | | 414/498 |
| 2016/0107560 | A1 | * | 4/2016 | Thygesen .............. B62D 33/08 |
| | | | | 296/37.6 |
| 2017/0341586 | A1 | * | 11/2017 | Wang ........................ B60R 7/02 |

OTHER PUBLICATIONS

European Search Report; Corresponding EP Application No. EP 22157805; Aug. 17, 2022.

* cited by examiner

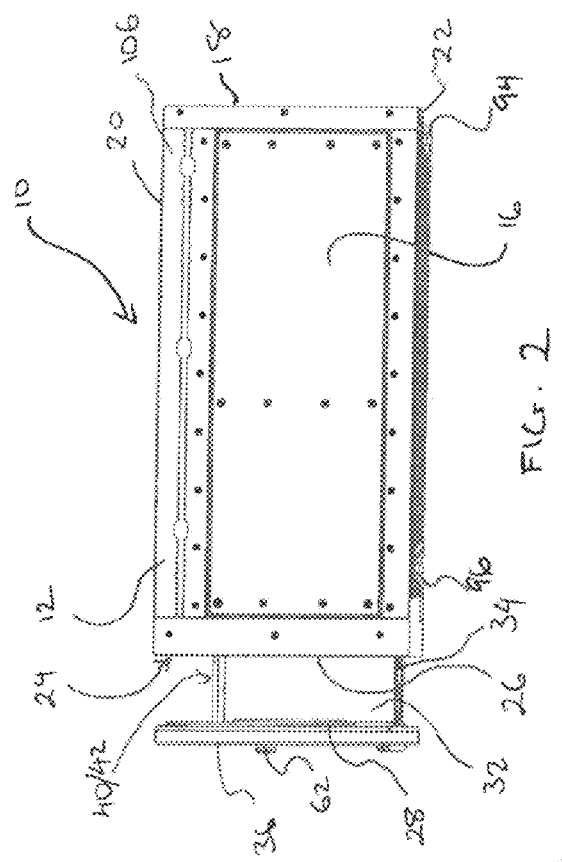
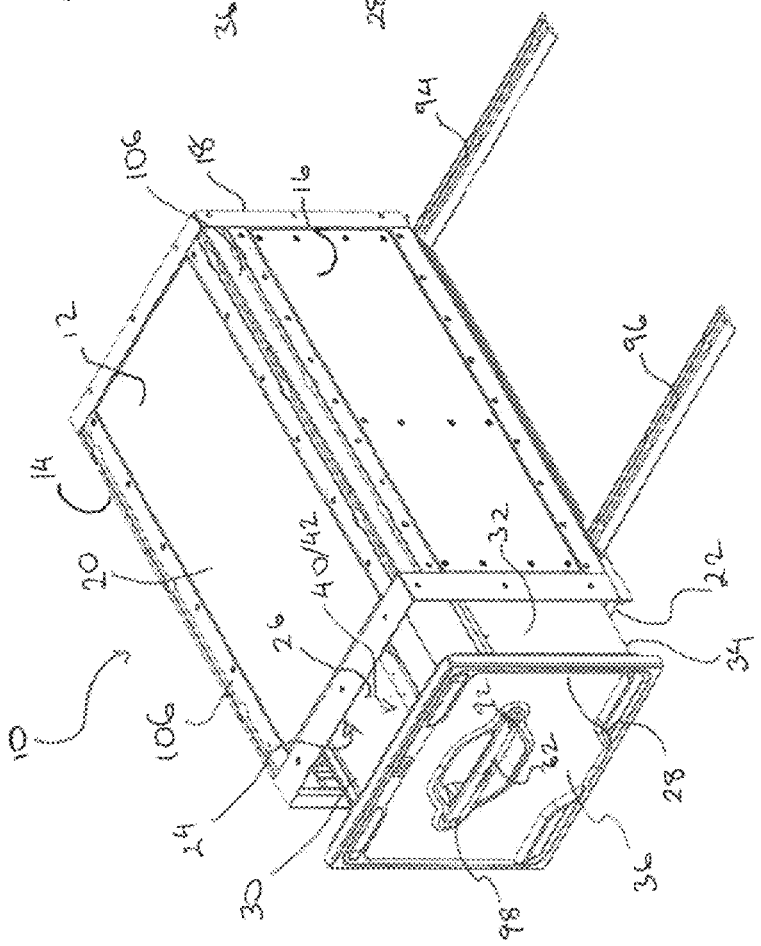

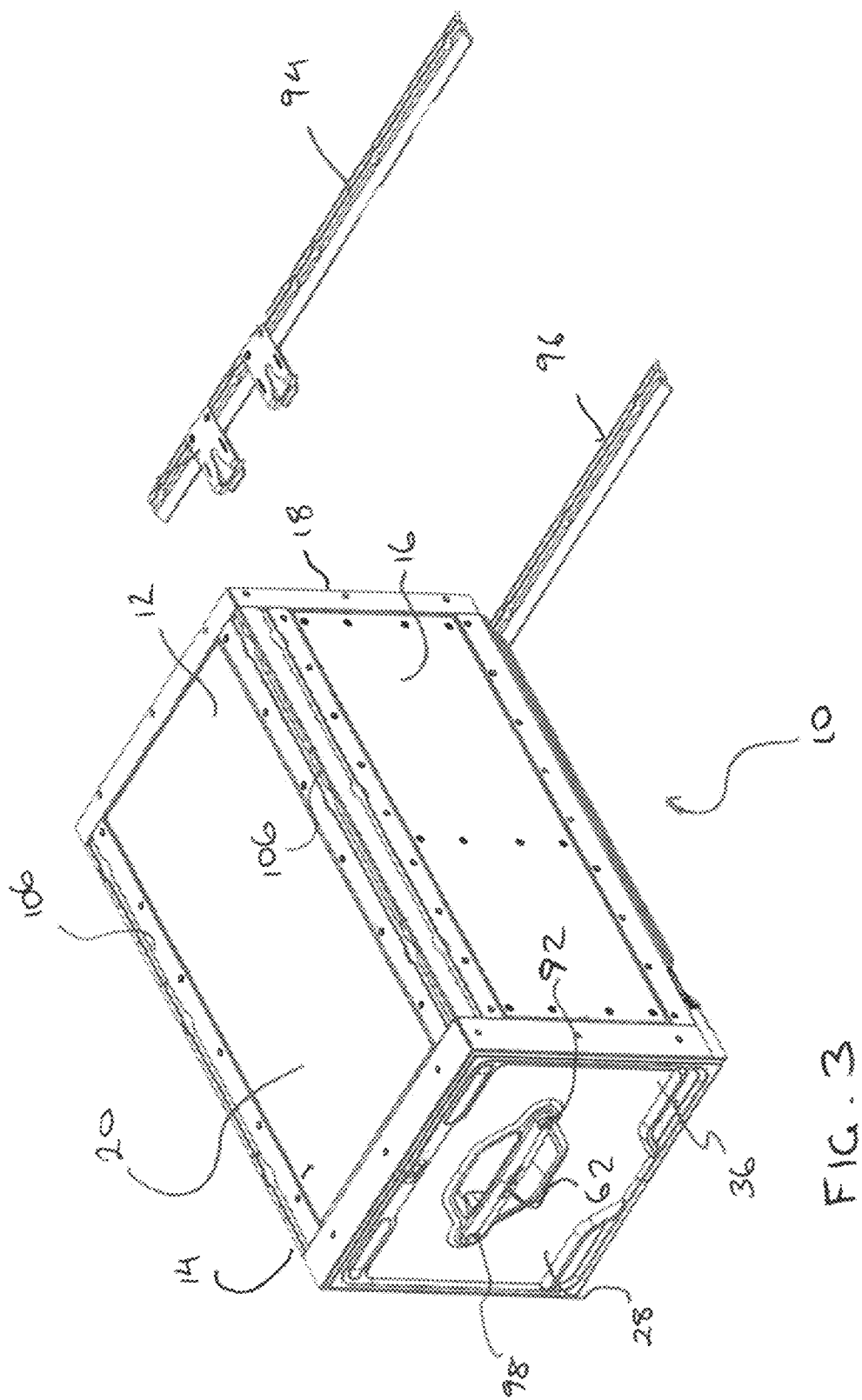

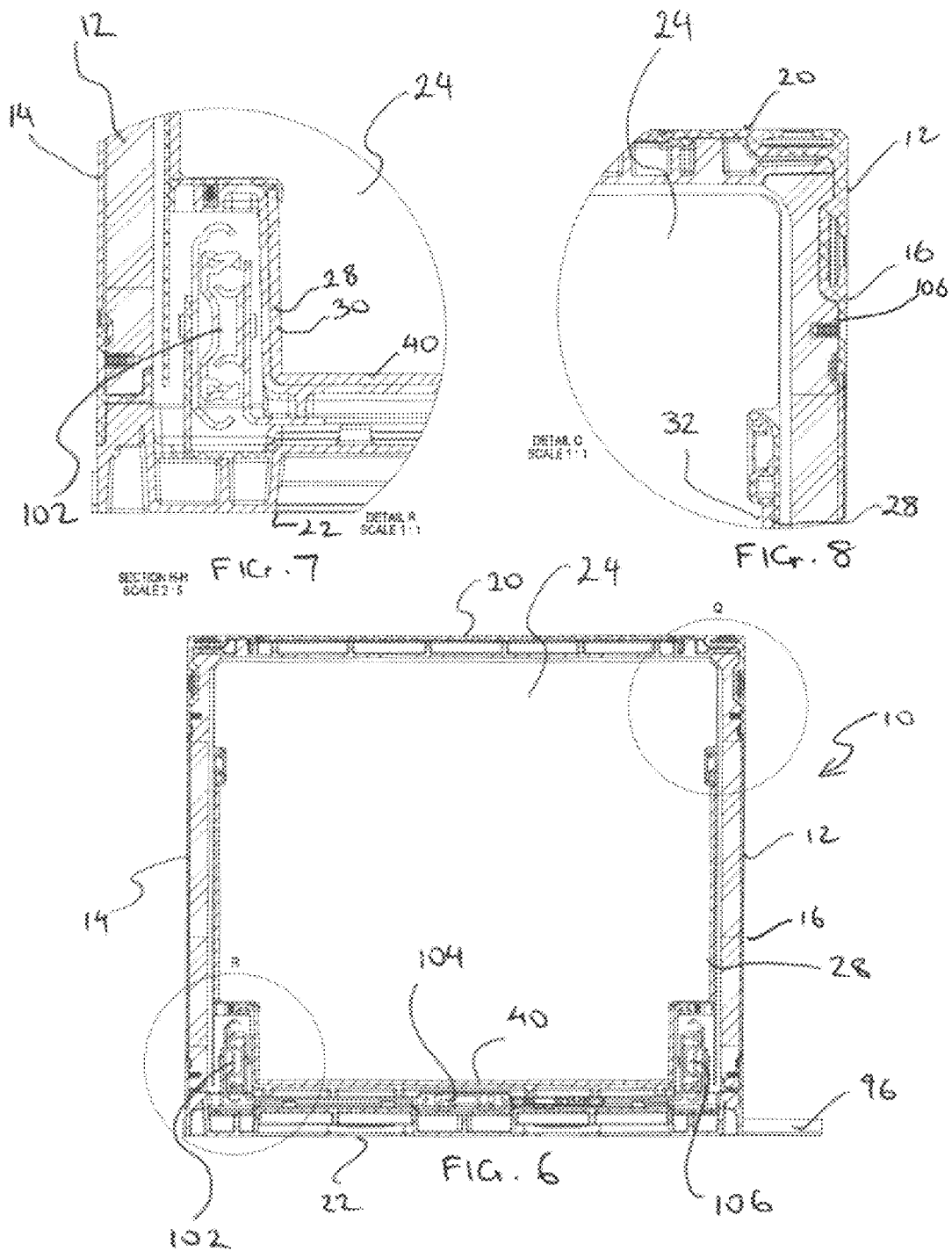

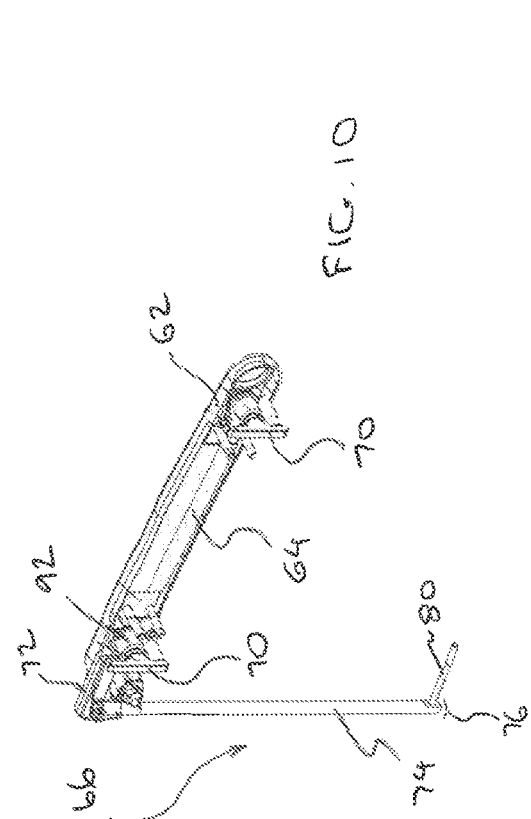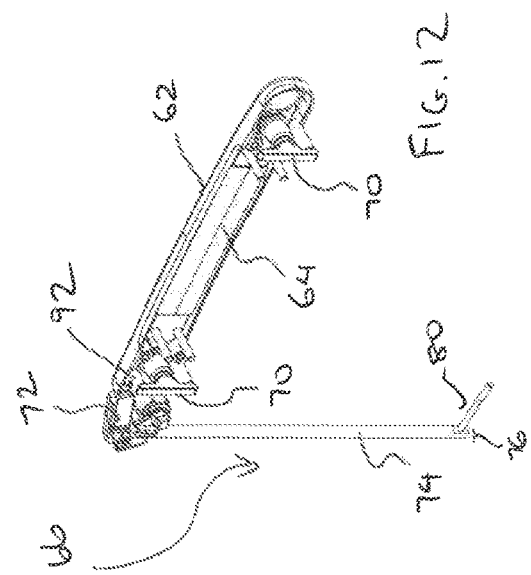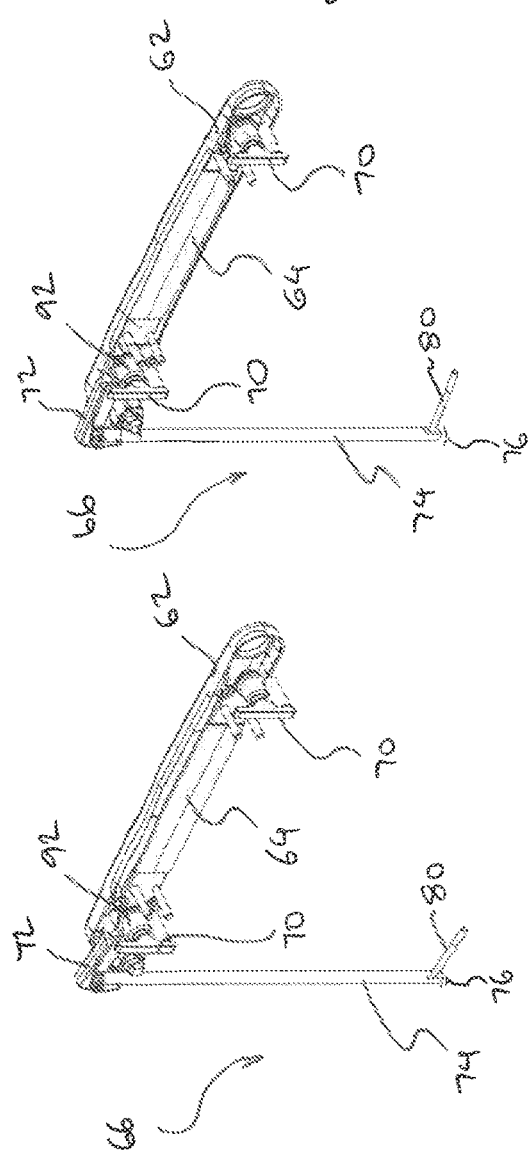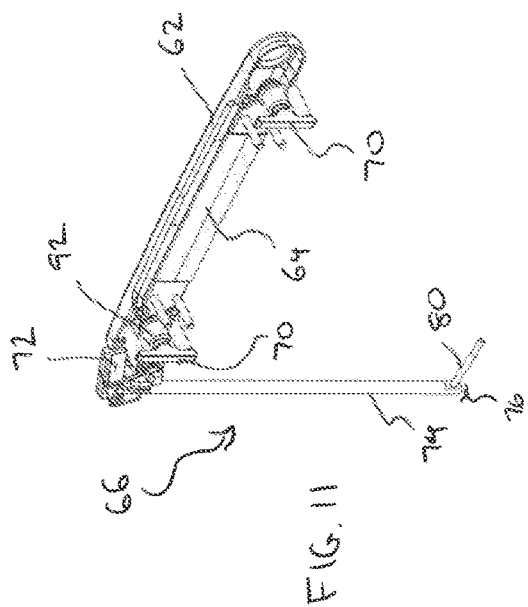

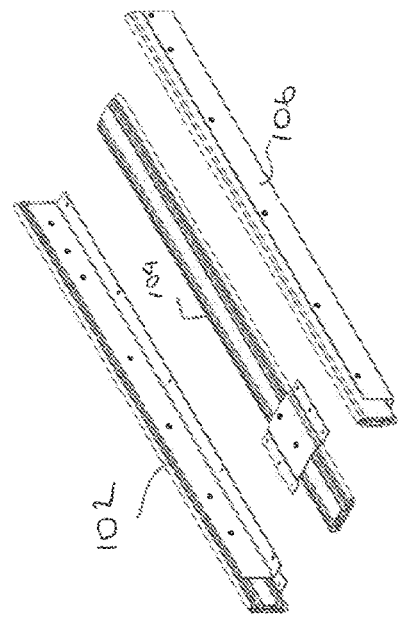
FIG.22
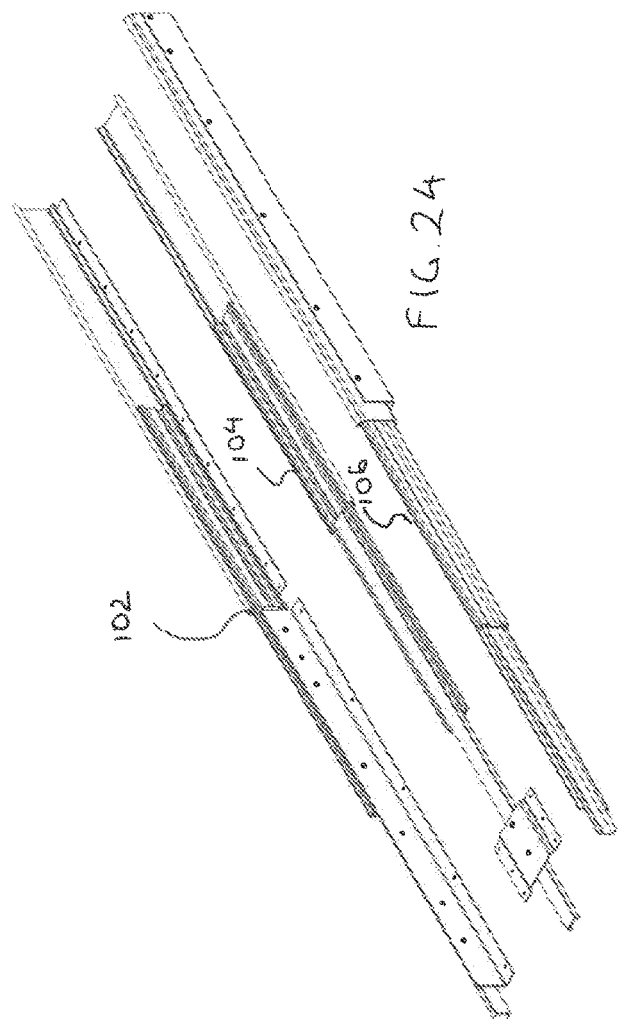
FIG.24
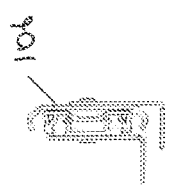
FIG.21
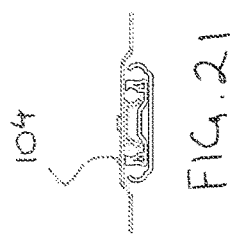
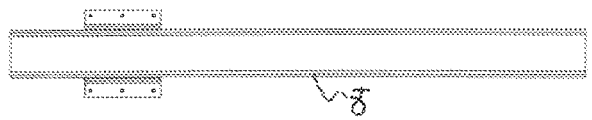
FIG.23
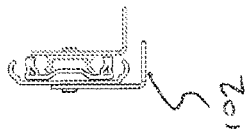
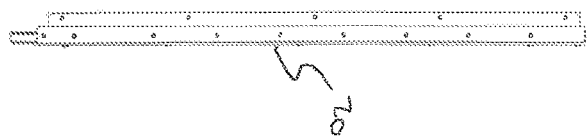

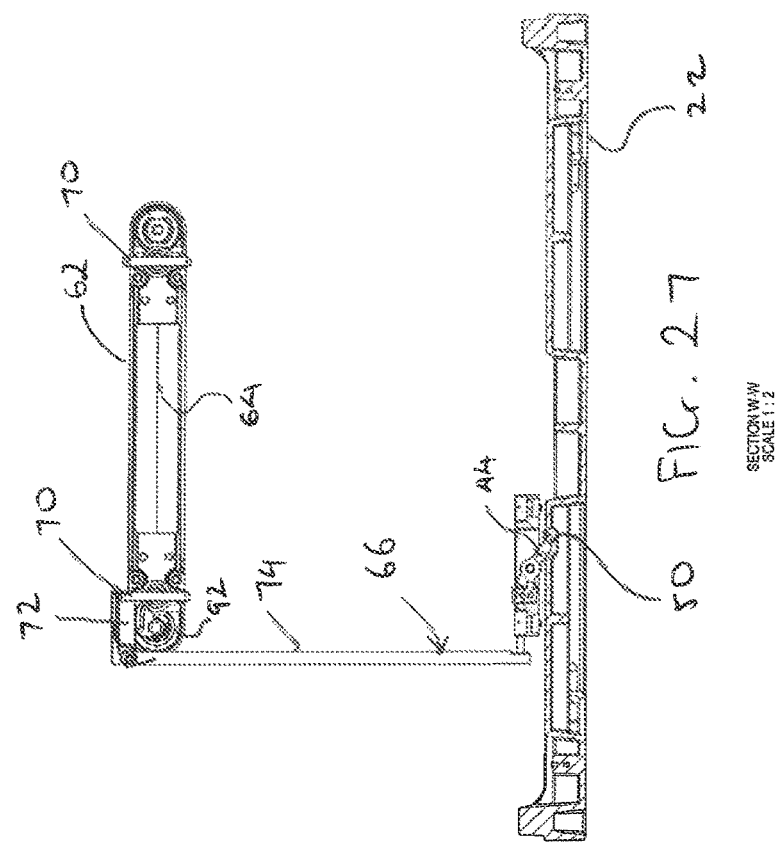
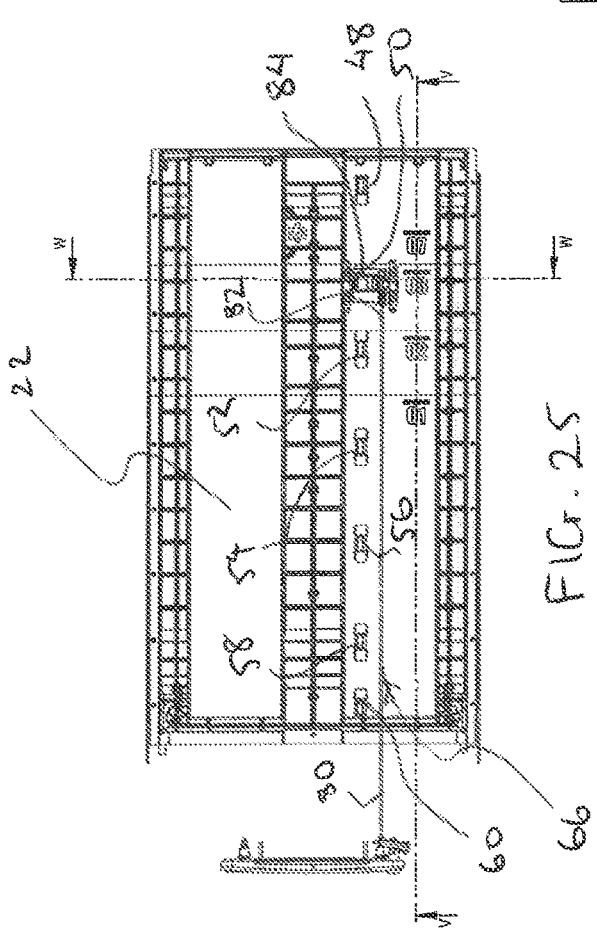
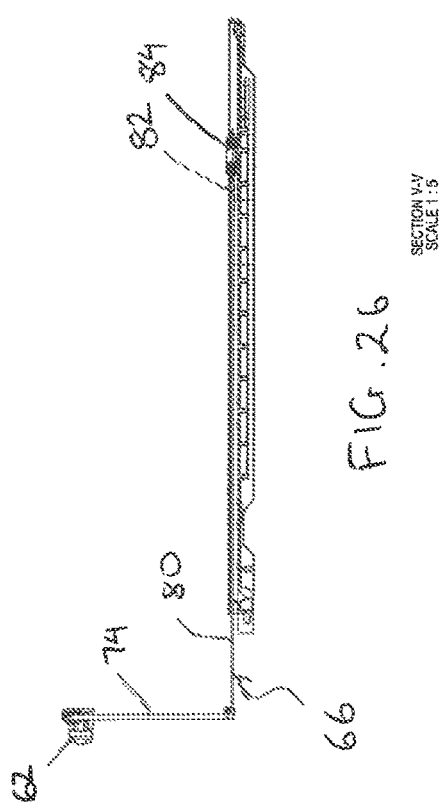

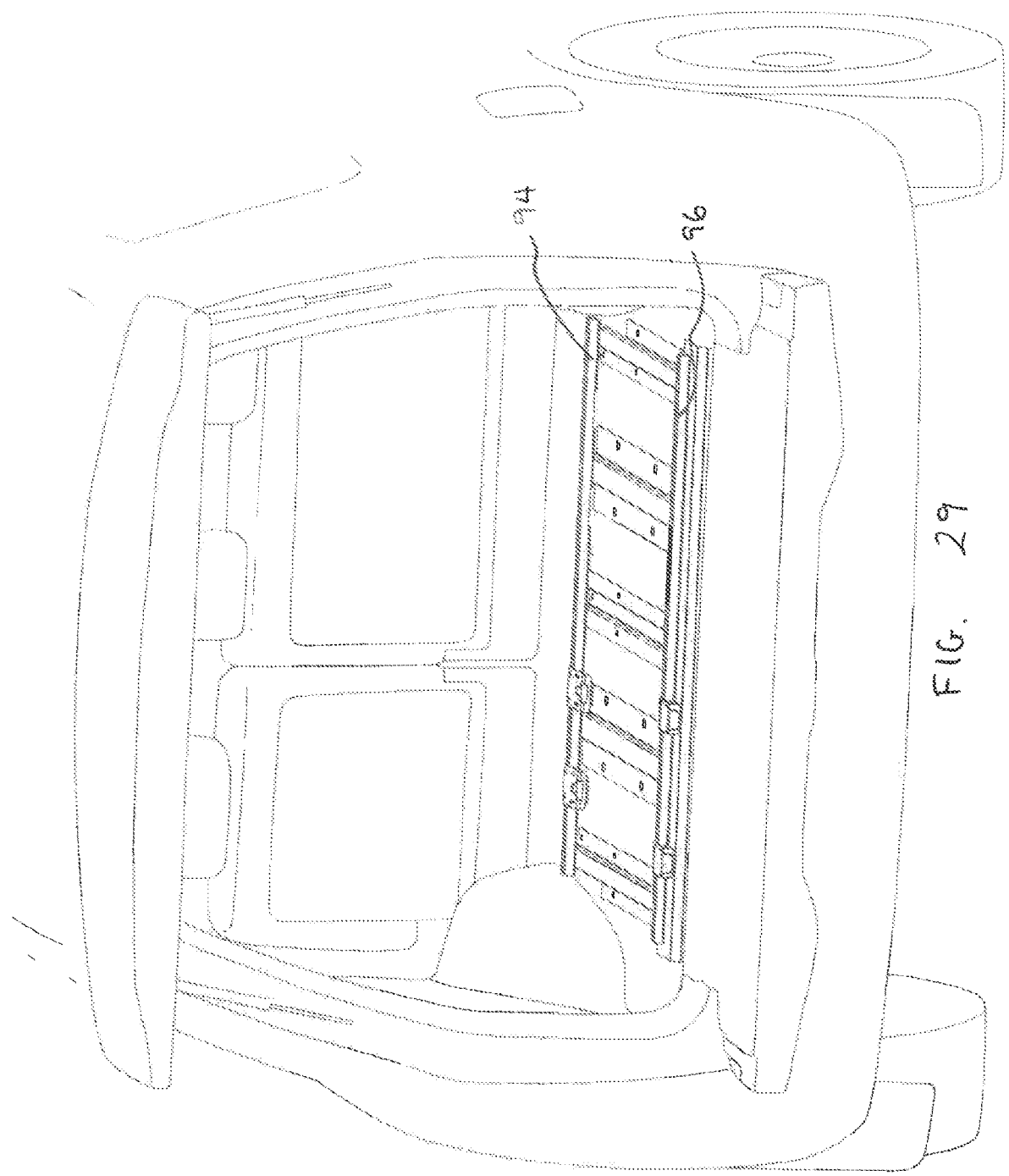

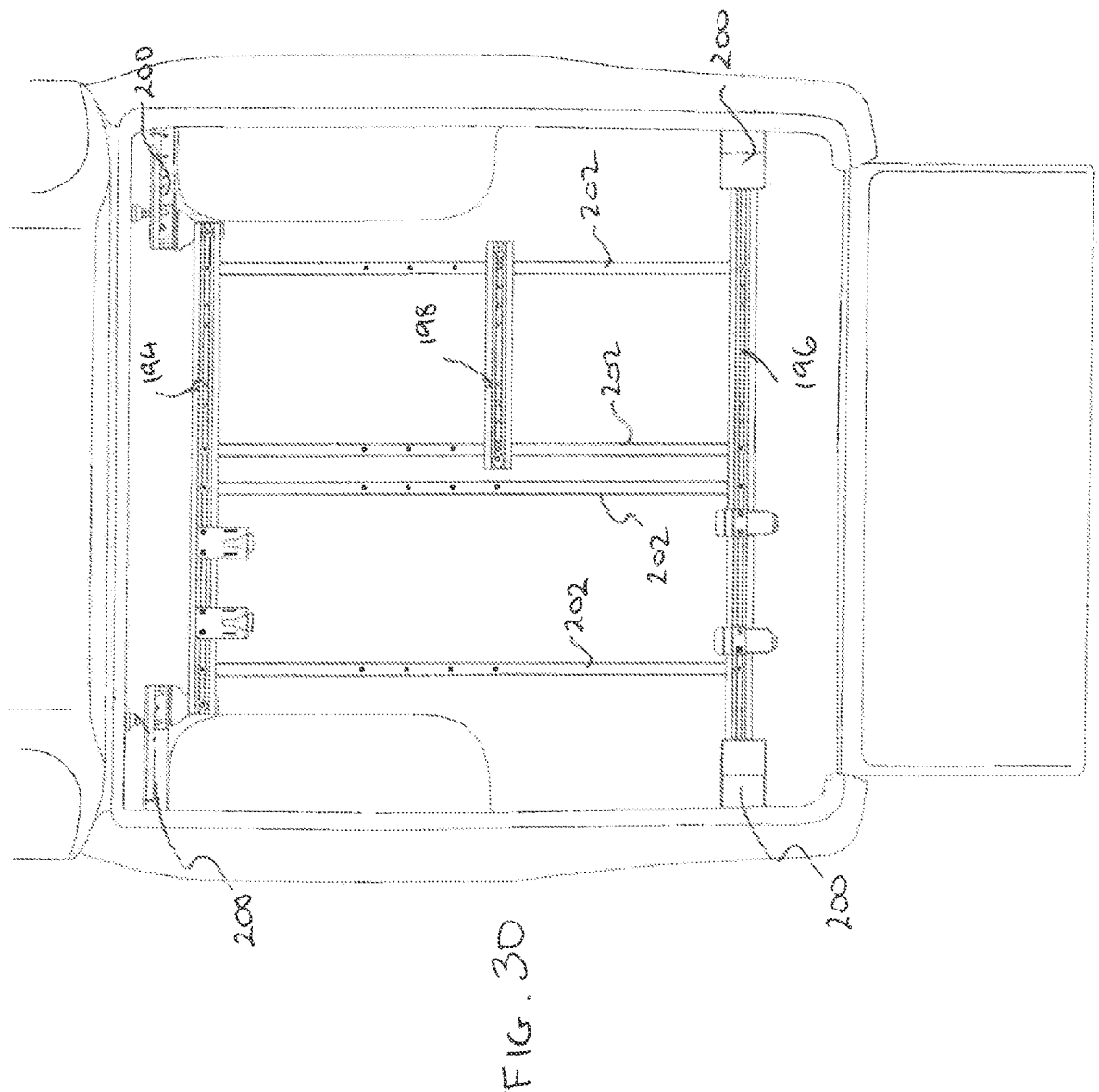

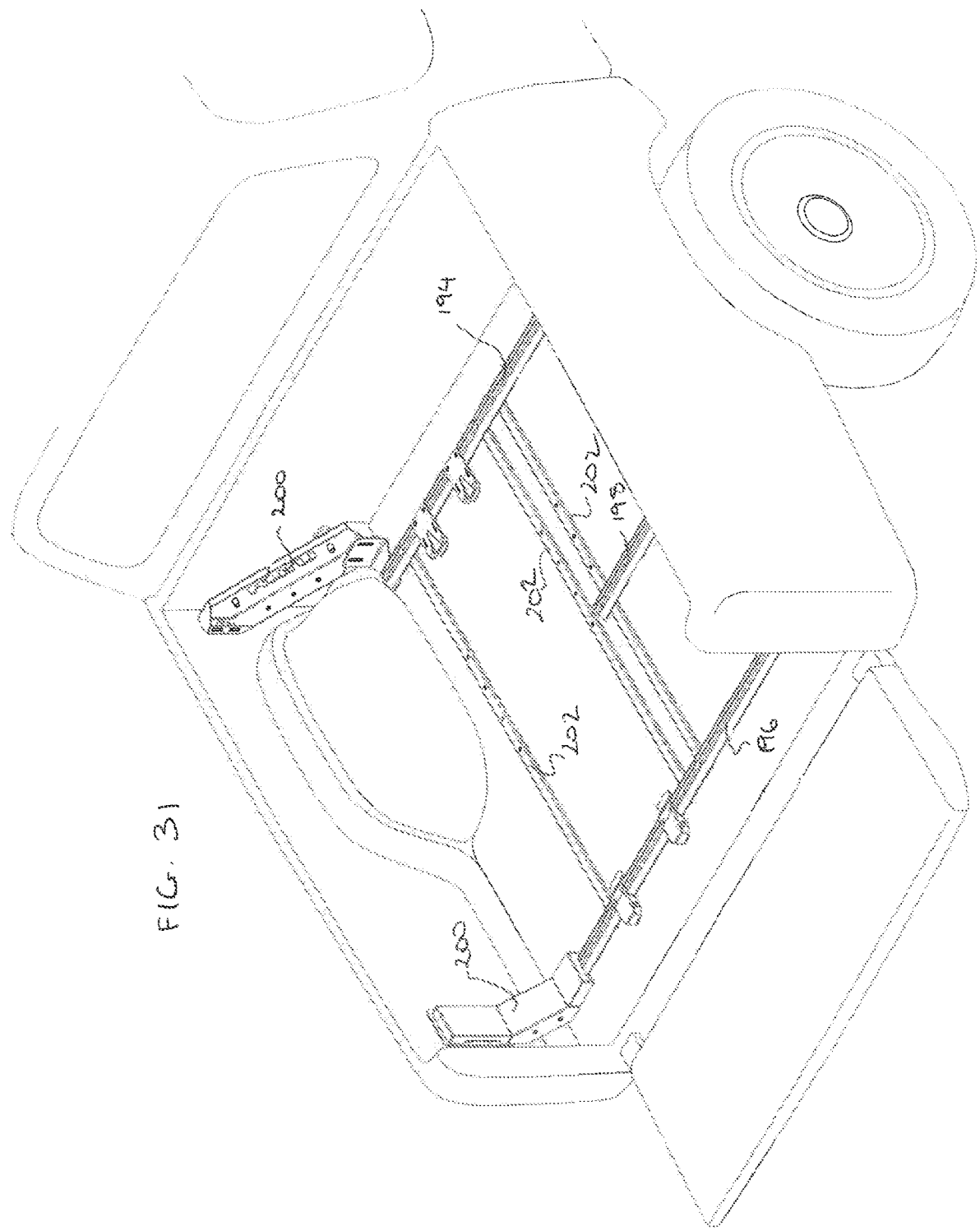

STORAGE SYSTEM SUITABLE FOR INSTALLATION IN OR ON A VEHICLE

TECHNICAL FIELD

The present invention relates to a storage system. The invention is particularly adapted for installation in the rear cargo space or luggage compartment (hereinafter collectively referred to as a "cargo space") of a 4WD, SUV, recreation vehicle, commercial vehicle and freight vehicle and will hereinafter be generally described in this context. The invention may also be utilised in towed vehicles such as trailers and caravans.

The applicant also envisages that the storage system may be adapted for use in other applications, including in buildings and other structures.

BACKGROUND OF INVENTION

In the cramped confines of a vehicle cargo space, recreational, camping, work, trade, luggage and other equipment is often haphazardly arranged and awkward to access when required.

Some vehicle owners and/or users choose to retro-fit some type of storage arrangement within their vehicle cargo space. These arrangements come in a variety of forms, in part, dependent on the specific requirements of the vehicle owner/user. Some existing arrangements are commercially available, while others are custom built by or for the vehicle owner/user.

Existing arrangements may include one or a combination of features including shelves, drawers and containers, as well as ancillary fittings to enable installation of portable fridges, and other equipment.

The reasons for installing a storage arrangement within a vehicle cargo space can be varied. For some, the desire to better and more orderly organise the cargo space contents is for improved safety, with the aim of preventing objects from moving about the vehicle when in motion. For others, an improved volume efficiency of the cargo space contents and being better able to access the cargo space without unpacking is desirable. For many, the installation of a storage arrangement is for a combination of these reasons.

Existing storage arrangements are usually fabricated from timber, sheet metal or aluminium. Where such arrangements include drawers, the drawer construction is usually a two-part construction, with an outer frame and inner drawer. The drawers are installed in the vehicle by bolting the outer frame to the sheet metal body of the vehicle.

The drawer designs of existing arrangements are considered by the applicant to be less than desirable. They are prone to jamming and/or breaking, at least in part, due to being insufficiently robust for their intended application. In this regard, the applicant considers existing arrangements to be insufficiently robustly designed in terms of the (often) heavy cargo loaded into them, and also in terms of the rugged off-road environments in which they're often used.

Another potential limitation of existing cargo space storage arrangements is this they are not easily adaptable or reconfigurable to meet the changing requirements of the user. For example, existing arrangements are generally impractical for a tradesman using their vehicle for work, who then wants to go camping and/or fishing for the weekend. The storage arrangement installed in the vehicle for the tradesman's work equipment may not be suitable or practical for accommodating camping/fishing and other equipment.

Moreover, existing storage arrangement installations make it impractical to remove (or reconfigure) the storage arrangement containing a tradesman's work equipment and temporarily replace it with a storage arrangement containing camping/fishing equipment.

Another potential limitation of existing storage arrangements is that they generally can't be transferred from one vehicle to another, such as may be desired if the owner/user wishes to upgrade or change their current vehicle. Consequently, a new storage arrangement must be installed in the new vehicle.

Finally, another potential limitation of many existing storage arrangements is the lack of security provided. This lack of security is two-fold. Firstly, existing arrangements generally provide insufficient security to prevent theft of the contents stored therein. Thus, if unauthorised access is gained to the vehicle then it is a relatively simple task to access and remove the drawer contents. Secondly, once unauthorised access is gained to the vehicle some existing storage arrangements are relatively easily removed in their entirety.

It would be desirable to provide a storage solution that at least partially addresses one or more of the above referred limitations of existing storage arrangements.

SUMMARY OF INVENTION

According to a broad aspect of the present invention, there is provided a storage system including a frame. The frame includes two opposing frame side walls, a frame rear wall, a frame top wall and a frame base (or floor), which collectively define a drawer receiving space. The frame has a front opening. A drawer is receivable in the drawer receiving space through the front opening. The drawer includes first and second opposing drawer side walls, a drawer base (or floor), a drawer front wall and a drawer rear wall, which collectively define a drawer storage space. The drawer has a top opening for receiving contents into the drawer storage space. A drawer position retainer is provided for releasably retaining the drawer in any one of at least two drawer positions relative to the frame. The at least two drawer positions include a closed position, wherein the drawer is at least substantially received within the frame; and a partially open position, wherein the drawer is partially received within the frame. The storage system further includes an actuator mounted to (or proximate) the drawer front wall for manually actuating the drawer position retainer.

In one preferred embodiment, an actuating linkage (or mechanism) extends between and connects the actuator to the drawer position retainer. In such an embodiment, at least a portion of the actuating linkage may be mounted to, and extends along, an underside of the drawer base. Such a location is desirable, since the actuating linkage would be hidden from view, thereby adding to an overall sleeker looking storage system. Another benefit of mounting the linkage to the underside of the drawer base is that it is less likely to be damaged from an accidental impact.

In one preferred embodiment, the retainer is movably mounted to the underside of the drawer base, with the retainer selectively receivable in a first receiving aperture (or "recess") provided in the frame base such that the drawer is releasably retained in the closed position. The retainer is also selectively receivable in a second receiving aperture provided in the frame base for releasably retaining the drawer in the partially open position relative to the frame.

Preferably, the retainer is biased into a retaining position, such that the retainer is biased into the first or second aperture when the retainer is aligned with the respective first or second aperture. In this regard, sliding of the drawer within the frame will continue until the retainer is received in one of the apertures, at which time any further sliding motion of the drawer will be prevented.

Such an arrangement, particularly in the context of vehicle mounted storage system, is considered by the applicant to be unique. The provision of the drawer position retainer substantially reduces the risk of damage to the drawer system. This is because it prevents the drawer being opened (or closed) in an uncontrolled manner whereby the drawer is able to move from the fully closed position to the fully open position (or vice versa), which may potentially damage the storage system and any contents within the drawer. In the context of a heavily laden drawer in a vehicle parked on a sloping surface, the retainer prevents the drawer (and contents) building up excessive opening (or closing) momentum, which is desirable. The retainer also reduces the risk of an impact injury to anyone standing in the path of the drawer when opening, and also reduces the risk of damage to any object that may be in the path of the opening drawer.

In at least some preferred embodiments of the invention, the retainer is selectively receivable in a plurality of additional receiving apertures provided in the frame base, with each additional aperture corresponding to a unique partially open position or a fully open position of the drawer relative to the frame. In these preferred embodiments, the first aperture, second aperture and plurality of additional apertures are provided in the frame base in an at least substantially aligned orientation that is at least substantially parallel to the direction of movement of the drawer relative to the frame.

The provision of additional receiving apertures desirably allows a user to retain the drawer in a range of possible partially open positions. Thus, the drawer may be retained in a slightly open position for retrieving a small item from the front of the drawer (or adding/returning a small item to the front of the drawer); while the drawer may be retained in a range of more open (or fully open) positions allowing for removal (or adding/return) of larger items to the drawer.

In one preferred form, a drawer handle is mounted to the drawer front wall, with the actuator located between the drawer handle and drawer front wall. The actuator may be movably mounted to the drawer front wall and/or the drawer handle. It is envisaged that the actuator would be pivotably mounted to one of the drawer front wall and drawer handle, although other suitable arrangements are also contemplated. In this form, a user would manually actuate the actuator by gripping both the drawer handle and actuator with a single hand and then squeezing the handle and actuator together with sufficient force to cause the actuator to pivot relative to the drawer handle.

The actuator arrangement referred to in the preceding paragraph preferably provides a toggle-type arrangement, whereby a user squeezes the drawer handle and actuator in the one action, causing a pivoting of the actuator relative to the handle and drawer. This pivoting action, in turn, lifts the retainer from its at rest position in one of the receiving apertures, thereby allowing for sliding movement of the drawer relative to the frame.

For the security of the drawer contents, the storage system preferably includes a lock for releasably locking the drawer in the closed position. The provision of a lock safely secures the drawer contents against theft.

A further benefit of the envisaged lock is that, when locked, it also prevents removal of the drawer from the frame, as well as prevents removal of the frame from the associated vehicle (or other suitable storage frame mounting location). In this regard, the frame is designed in modular form, with the frame configured for to be releasably mounted to a rail mounting arrangement. With the envisaged lock, the frame (and drawer) can be removed from the rail mounting arrangement only when the drawer is in the open position. Thus, the lock prevents unauthorised removal of the entire frame and drawer.

The lock could be of any suitable type. A key lock is envisaged, although a combination lock or other suitable lock may be incorporated into the storage system, if desired.

Preferably, a first telescoping slider arrangement is mounted to the underside of the drawer base and an upper side of the frame base. The first telescoping slider arrangement enables movement of the drawer relative to the frame between a fully open drawer position and the closed position.

Preferably, the storage system includes a second telescoping slider arrangement, with the first slider arrangement mounted to the underside of the drawer base along or proximate to a first side edge of the drawer base, and the second slider arrangement mounted to the underside of the drawer base along or proximate to a second side edge of the drawer base. Such an arrangement is desirable, because it provides a well-balanced sliding configuration, with the weight of the drawer and drawer contents supported by the two slider arrangements. The provision of the slider arrangements mounted underneath the drawer base desirably allows for a clearance gap between the outer surface of the drawer sidewalls and the inner surface of the frame sidewalls. It also desirably allows for the slider arrangement to be hidden from view, even with the drawer in a fully open position. These benefits can be are particularly pronounced when comparing the slider arrangements of the present invention, which are mounted to the underside of the drawer base and upper side of the frame base, with the roller and slider arrangements of existing vehicle storage system arrangements, which are mounted to the drawer sidewalls.

It is also envisaged that a third slider arrangement mounted may be provided in a parallel orientation with and between the first and second slider arrangements. This third slider arrangement may further enhance the smooth sliding feel of the drawer and further limit the likelihood of drawer 'wobble' or jamming. The provision of a third slider arrangement may assist in reducing the likelihood of the drawer 'wobbling' and potentially jamming when opening and closing the drawer.

The storage system may be configured such that one or more of the first, second and third slider arrangements may be adaptable, such that suitable mounting locations on the drawer and frame may be selected to suit a specific installation. This may entail the provision of a plurality of mounting aperture sets provided on both the drawer and frame for mounting the slider arrangements, as well as differing slider arrangement lengths, depending of the dimensions of the storage system for a given application. The slider arrangements may be reconfigured and rearranged to provide a new position and more space for insulation and other features and functions between or around the drawer and the frame, if desired.

At least one light may be mounted to the drawer front wall or drawer handle. The light may be provided for illuminating at least a portion of an exterior surface of the drawer front wall and/or drawer handle and/or drawer contents. The lights may be LEDs, LED strip lights or other suitable light types. A suitably located ON/OFF switch may be provided for operating the lights.

As previously stated, the present invention is especially, but not exclusively, designed for installation in or to a vehicle. The frame is configured for mounting to first and second support rails, with rail mounts utilized for mounting the first and second rails in or to the vehicle. In particular, the storage system of the present invention is specifically, but not exclusively, configured for mounting the first and second rails in the rear luggage compartment of a 4WD, SUV, recreation vehicle, commercial vehicle or freight vehicle.

So far, the invention has been described in the context of a storage system. However, the invention is also more broadly directed to a vehicle including a storage system of the type described previously.

BRIEF DESCRIPTION OF DRAWINGS

It will be convenient to hereinafter describe embodiments of the invention with reference to the accompanying drawings. The particularity of the drawings is to be understood as not limiting the preceding broad description of the invention.

FIG. 1 is an isometric view of a storage system according to one aspect of the present invention, and with an associated drawer in a partially open position.

FIG. 2 is a side view of the storage system shown in FIG. 1.

FIG. 3 is an isometric view of the storage system of FIG. 1 in a partially installed state, and with the drawer fully closed.

FIG. 6 is a sectional front view of the storage system shown in FIG. 1.

FIG. 7 is a magnified view of the lower left-hand portion of the storage system shown in FIG. 6.

FIG. 8 is a magnified view of the upper right-hand portion of the storage system shown in FIG. 6.

FIG. 9 is an upper rear isometric view of a portion of the actuating linkage of the storage system shown in FIG. 1 when shown in a first mode of an operating sequence.

FIG. 10 is an upper rear isometric view similar to that of FIG. 9; but shown in a second mode of an operating sequence.

FIG. 11 is an upper rear isometric view similar to that of FIG. 10; but shown in a third mode of an operating sequence.

FIG. 12 is an upper rear isometric view similar to that of FIG. 11; but shown in a fourth mode of an operating sequence.

FIG. 21 is front end view of the telescoping slider arrangement of the storage system of FIG. 1 when in a closed position.

FIG. 22 is an upper front isometric view of the telescoping slider arrangement shown in FIG. 21 when in a closed position.

FIG. 23 is a bottom view of the telescoping slider arrangement of the storage system of FIG. 21 when in a closed position.

FIG. 24 is an upper front isometric view of the telescoping slider arrangement of FIG. 21 when in an open position.

FIG. 25 is a bottom view of a portion of the storage system of FIG. 1. FIG. 25 shows only the frame base, the handle and the actuating mechanism.

FIG. 26 is a side view of the components shown in FIG. 25.

FIG. 27 is a sectional rear view of the components shown in FIG. 25.

FIG. 29 is an isometric view of a rail mounting arrangement suitable for a storage system of the type illustrated in FIG. 1 when positioned in the rear cargo space of a vehicle.

FIG. 30 is a plan view of another rail mounting arrangement, when fitted in the rear cargo space of another vehicle.

FIG. 31 is an isometric rear view of the arrangement shown in FIG. 30.

DETAILED DESCRIPTION

Figure 5:
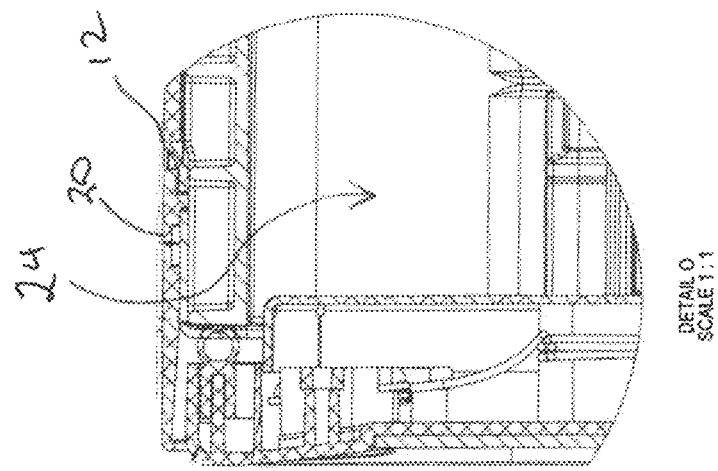
FIG. 5 is a magnified view of the upper left-hand portion of the storage system shown in FIG. 4.
Figure 4:
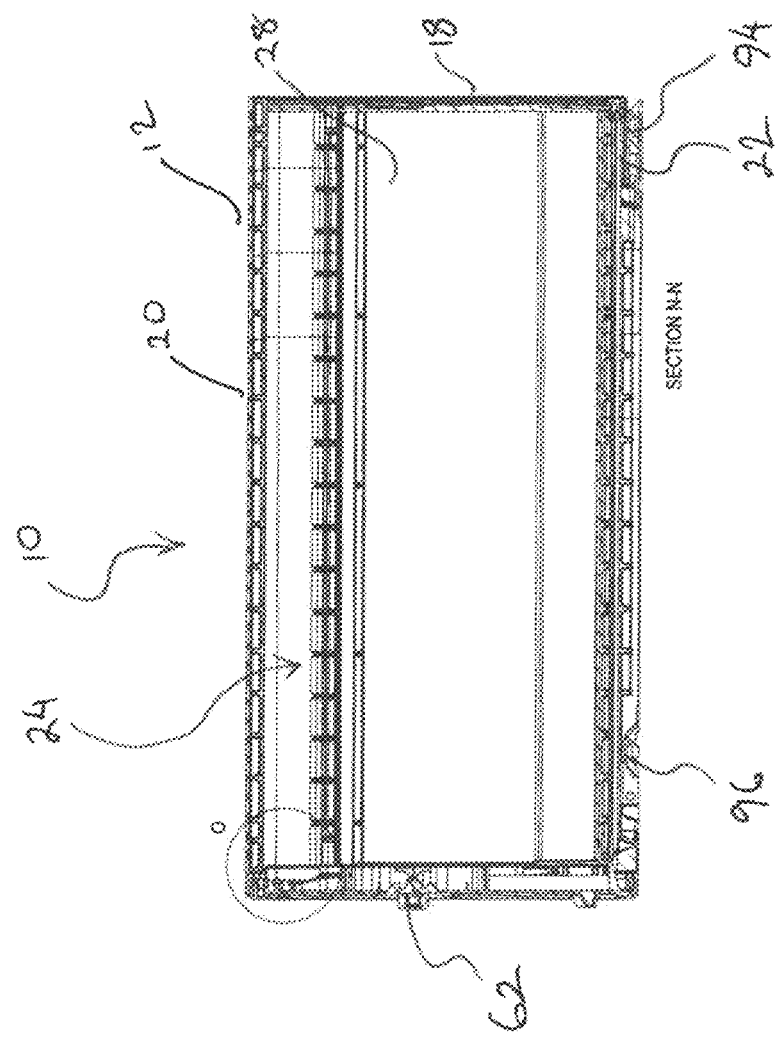
FIG. 4 is a sectional side view of the storage system shown in FIG. 1.
Figure 13:
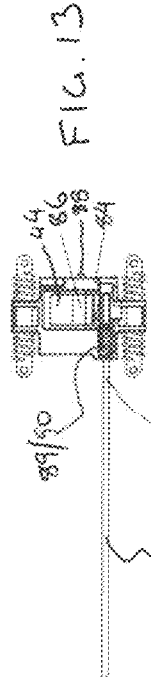
FIG. 13 is a top view of another portion of the actuating linkage of the storage system of FIG. 1 when shown in a retaining mode.
Figure 15:
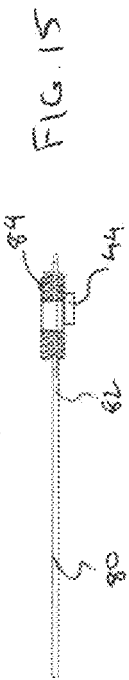
FIG. 15 is a side view of the arrangement shown in FIG. 13.
Figure 16:
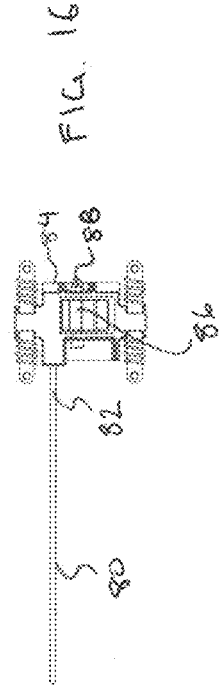
FIG. 16 is a bottom view of the arrangement shown in FIG. 13.
Figure 14:
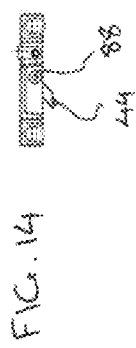
FIG. 14 is an end view of the arrangement shown in FIG. 13.
Figure 17:
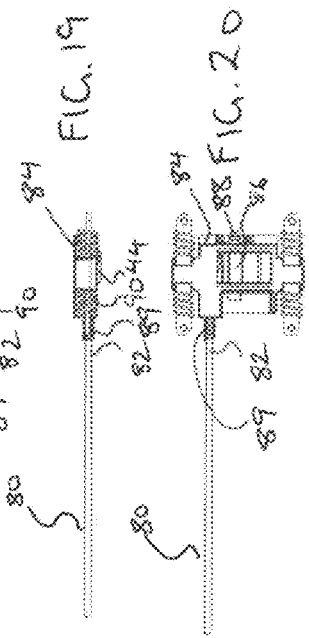
FIG. 17 is a top view of the actuating linkage portion shown in FIG. 13 when in a non-retaining mode.
Figure 18:
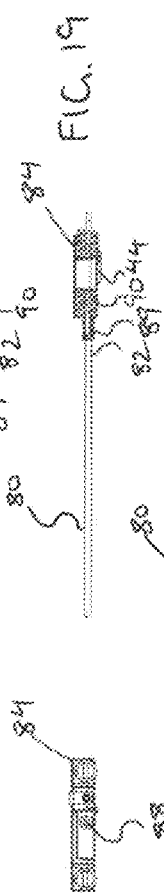
FIG. 18 is an end view of the arrangement shown in FIG. 17.
Figure 19:
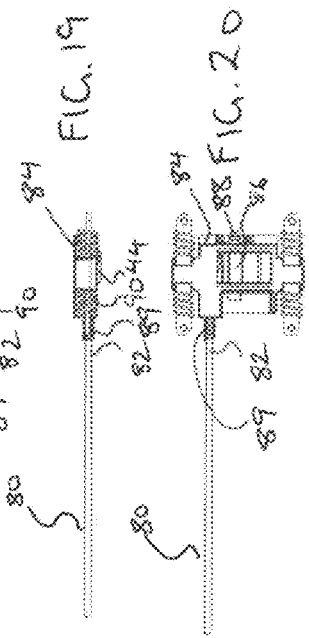
FIG. 19 is a side view of the arrangement shown in FIG. 17.
Figure 20:
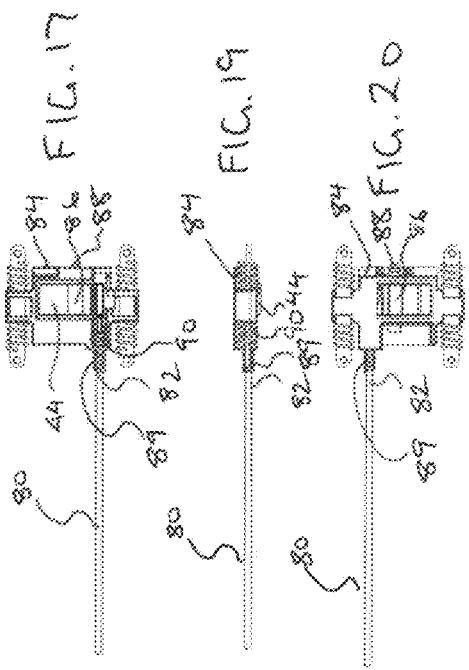
FIG. 20 is a bottom view of the arrangement shown in FIG. 17.

Referring to FIGS. 1 to 27, there is shown a storage system 10.

The storage system 10 is especially, but not exclusively, designed for installation in or to a vehicle. As shown in FIG. 29, the storage system 10 is specifically (but not exclusively) configured for mounting in the rear luggage compartment of a 4WD, SUV, recreation vehicle, commercial vehicle or freight vehicle.

The system 10 includes a frame 12 having two opposing frame side walls 14, 16, a frame rear wall 18, a frame top wall 20 and a frame base (or floor) 22, which collectively define a drawer receiving space 24. The frame 12 has a front opening 26. A seal (not clearly identifiable in the drawings) is provided about the opening 26 so as to restrict the ingress of dirt and moisture. The applicant also refers to the frame 12 as a 'carcass'.

The frame 12 would typically be releasably connected to rails 94, 96 of the type shown in FIG. 29. The rails 94, 96 are mounted in a desired position within a vehicle cargo space, by suitably configured rail mounts (not shown).

The frame 12 is comprised of 3 main low-profile panels moulded from glass fibre reinforced polymer. The panels may be moulded or assembled with threaded inserts at their perimeter for fastening at the assembly stage.

The illustrated frame 12 includes aluminium extrusions 106 that overlap the junction of the side walls 14, 16 with the top wall 20. The aluminium extrusions 106 provide additional support for walls 14, 16, 20 and assist in limiting relative movement of the walls. The extrusions 106 also allow for bolts to be screwed into the top wall 20 and the side walls 14, 16. The junction between the walls 14, 16, 20 may be braced by a rebate in the lower outer edge of the top wall 20 panel that aligns with a buttress feature at the top of the side wall panels 14, 16.

The side walls 14, 16 are smooth on the outer sides and are also trimmed by a thin panel that is captured by upper edge aluminium rails and front and rear rails. This provides an overlap, that desirably acts as a weather seal restricting the ingress of dust and moisture into the frame 12.

The storage system also includes a drawer 28 receivable in the drawer receiving space 24 through the front opening 26. The drawer 28 includes first and second opposing drawer side walls 30, 32, a drawer base or (floor) 34, a drawer front wall 36 and a drawer rear wall 38, which collectively define a drawer storage space 40. The drawer 28 has a top opening 42 for receiving contents into the drawer storage space 40.

The underside of the frame top wall 20 is smooth to minimize restriction of free movement of the drawer 28.

Referring to FIGS. 13 to 20 and 27, a drawer position retainer 44 ("also referred to by the applicant as a 'toggle') is provided for releasably retaining the drawer 28 in any one of seven drawer positions relative to the frame 12. In this regard, the retainer 44, which is pivotably mounted via pivot axle 46, to the underside of the drawer base 34, is releasably received in any one of frame recesses 48, 50, 52, 54, 56, 58, 60. Recesses 48, 50, 52, 54, 56, 58, 60 are most clearly shown in FIG. 25. It can be seen that the recesses 48, 50, 52, 54, 56, 58, 60 are aligned in the direction of forwards and rearwards movement of the drawer 28 relative to the frame 12.

The retainer 44 received in the recess 48 corresponds to the drawer 28 being in a fully closed position relative to the frame 12. When the retainer 44 is received in recess 50 the drawer 28 is retained in a partially (slightly) open position. Each of recesses 52, 54, 56, 58 is provided for releasably retaining the drawer 28 in a unique partially open position. When the retainer 44 is received in recess 60 the drawer is in a substantially fully open position.

The provision of the retainer 44 and recesses 48, 50, 52, 54, 56, 58, 60 is considered by the applicant to be unique in the context of vehicular applications. It is also considered a desirable feature, because it is a relatively simple yet effective way of retaining the drawer 28 in any one of an open, closed or range of partially open positions. It prevents the drawer 28 sliding in an unrestrained and uncontrolled manner, which may cause injury to anyone in close proximity to the drawer 28. It also substantially lessens the likelihood of damage to the drawer contents and vehicle tailgate and any objects in close proximity to the drawer 28.

The reader is to appreciate that any reference to a 'tailgate' in this specification could instead refer to an arrangement containing any one of a door(s) hatch or boot cover.

As stated previously (particularly in the context of a heavily laden drawer in a vehicle parked on a sloping surface) the provision of the spring-biased retainer 44 substantially reduces the risk of damage to the storage system 10, because it prevents the drawer 28 (and any contents) building up excessive opening (or closing) momentum.

The provision of receiving apertures 50, 52, 54, 56, 58 desirably allows a user to retain the drawer 28 in a range of possible partially open positions. Thus, the drawer 28 may be retained in a slightly open position for retrieving a small item from the front of the drawer 28 (or adding/returning a small item in the front of the drawer 28); while the drawer may be retained in a range of more open positions allowing for removal (or adding/returning) of larger items to the drawer 28.

The retainer 44 is biased in a downwards direction into receiving engagement with the recesses 48, 50, 52, 54, 56, 58 60 by way of a suitable configured spring.

A drawer handle 62 is mounted to the drawer front wall 36.

Referring to FIGS. 9 to 12 and 27, a manually operated actuator handle 64 is pivotably mounted to the drawer front wall 36, behind the drawer handle 62. The actuator handle 64 is a similar shape to the of the drawer handle 62, and is discreetly located behind handle 62 such that it is largely hidden from view. The actuator handle 62 is provided for manually actuating the drawer position retainer 44. The applicant describes the operation of the actuator handle 64 as a 'toggle' type arrangement. The actuator handle is biased away from the drawer handle 62 by way of springs, which bias the actuator handle 64 towards drawer front wall 36.

It is to be appreciated that the action of grasping and pulling/pushing the drawer handle 62 and actuator handle 64 in the one action has the dual effect of releasing the retainer 44 and provides the force required to push or pull the drawer 28 in the desired opening/closing direction.

It can be seen particularly in FIGS. 9 to 12, that an actuating linkage (or mechanism) 66 extends between and connects the actuator handle 64 to the retainer 44. The linkage 66 is mounted to the drawer 28 and extends from the actuator handle 64 downwardly through a cavity provided in the drawer front wall 36, and then along the underside of the drawer base 34, wherein it connects to the retainer 44. This placement of the linkage 66 is desirable, as it is hidden from view and so assists in providing a sleek looking arrangement. Another benefit of mounting the linkage 66 to the underside of the drawer base 34 is that it is less likely to be damaged during use of the storage system 10. The linkage 66 may be provided in the form of a sub-assembly.

When the actuator handle 64 is squeezed by the user's hand the actuator handle 64 moves. This action also moves a T-shaped toggle 70 and then rotates paddle 72. The paddle 72 is connected to a vertically aligned rod 74 that is captured on circular seats 76 (not shown), allowing it to rotate but to not to translate its position. The rod 74 captures the movement of the actuator handle 64 and transfers it to a rotation of rod 74. The rod 74 extends downwardly through the cavity in the drawer front wall 36.

Referring to FIGS. 13 to 20, and 25 to 27, a fixed pin proximate the lower end of the vertical rod 74 aligns with a horizontally extending connecting rod 80 mounted to the underside of the drawer base 34 to, in turn, transfer the rotational movement of rod 74 into a longitudinal movement of the rod 80 beneath the drawer 28. The downstream end 82 of rod 80 is screwed into a small keyed sled 84.

The provision of sled 84 is considered desirable, as it limits movement of the downstream end 82 of the rod 80 to a fore and aft longitudinal direction; and restricts any undesirable rotation or twist of the rod 80. The sled 84 has a laterally extending cylindrical protrusion 86. The protrusion 86 pivotably receives and supports retainer 44. The retainer 44 is secured in position to the protrusion 86 by a threaded central pin or bolt 88.

A helical threaded recess 89 about the axis of rotation is provided on the body of retainer 44 overlapping the protrusion 86. The helical thread 89 cooperates with protrusion 86. With this cooperating arrangement, the back and forth movement of the rod 80 beneath the drawer base 34 rotates the retainer 44 into and out of whichever recess 48, 50, 52, 54, 56, 58, 60 it is presently aligned with.

When it is desired to (at least partially) open or close the drawer 28, a user squeezes the combination handle 62 and actuator handle 64, which causes the actuator handle 64 to move relative to the drawer front wall 36. This action, in turn, pivots the retainer from its at rest position in one of the receiving apertures 48, 50, 52, 54, 56, 58, 60, thereby allowing for sliding movement of the drawer 28 relative to the frame 12. Release of the combination handle 62 and actuator handle 64 allows the retainer 44 to be selectively received in another of the receiving apertures 48, 50, 52, 54, 56, 58, 60 which may occur on sliding the drawer 28 in a forwards or rearwards direction until the retainer is received in the desired receiving aperture 48, 50, 52, 54, 56, 58, 60.

Referring to FIGS. 1, 3 and 9 to 12 and 27, the drawer 28 includes a key actuated security lock 92 extending into drawer front wall 36. When locked, the lock 92 secures the drawer contents against theft. In this regard, when locked, the lock 92 prevents removal of the drawer 28 from the frame 12, and also prevents removal of the frame 12 from the associated vehicle (or other suitable storage frame mounting location). This is possible, because the latch(es) for separating the frame from the rails 94, 96 are only accessible with the drawer 28 in an open position. The latch(es) for separating the frame 12 from the rails 94, 96 are not accessible when the drawer 28 is closed and locked.

With the drawer 28 in the closed position (as shown in FIG. 3), and with the lock 92 in the locked position, the lock 92 prevents movement of the actuating linkage 66. This, in turn, prevents removal of the retainer 44 from the recess 48 and the drawer 28 from being opened. FIG. 9 shows lock 92 in the unlocked position, but with the actuator handle 64 in it's at rest position such that the drawer 28 cannot move. FIG. 10 also shows the lock 92 in the unlocked position, but with the actuator handle 64 now 'squeezed' (or actuated) such that the drawer is free to slide open. FIG. 11 shows the lock 92 in a key-locked position, and further shows the actuator handle in it's at rest position. In this mode the drawer cannot be opened. FIG. 12 shows the lock 92 in a locked position, but with the actuator handle 64 in its 'squeezed' (or actuated) position. In this position the drawer 92 cannot be opened unless the lock 92 is moved to the unlocked position.

Referring to FIGS. 6, 7 and 21 to 24, another unique feature of the storage system 10 is the provision of first, second and third telescoping (or telescopic) slider arrangements 102, 104, 106. The slider arrangements 102, 104, 106 enable movement of the drawer 28 relative to the frame 12 between the fully open drawer position and the closed position. Each of the slider arrangements 102, 104, 106 is mounted to the underside of the drawer base 34 and an upper side of the frame base 22. In the context of the previously provided broad description, the slider arrangement 102 may be considered a 'first' slider arrangement; slider arrangement 106 may be considered a 'second' slider arrangement; and slider arrangement 104 may be considered a 'third' slider arrangement.

It can be seen that the slider arrangements 102, 104, 106 extend in a parallel orientation; and are spaced approximately equidistantly to the underside of the drawer base 34. This arrangement is desirable, because it provides a well-balanced drawer sliding arrangement, with the weight of the drawer 28 and any drawer contents supported by all three slider arrangements 102, 104, 106. The provision of three spaced slider arrangements 102, 104, 106 has been found to substantially reduce the likelihood of the drawer 28 'wobbling' and potentially jamming when opening and closing the drawer 28; and provides a smooth sliding feel for the user. The provision of the slider arrangements 102, 104, 106 mounted to the underside of the drawer base 34 desirably allows for a clearance gap between the outer surface of the drawer sidewalls 30, 32 and the inner surface of the frame sidewalls 14, 16. It also desirably allows for the slider arrangements 102, 104, 106 to be hidden from view, even with the drawer 28 in a fully open position. These benefits can be are particularly pronounced when comparing the slider arrangements 102, 104, 106 (which are mounted to the underside of the drawer base 34) with the roller and slider arrangements of existing vehicle storage system arrangements, which are mounted to the drawer sidewalls.

Some existing commercially available drawer arrangements utilise roller bearings or telescoping slider arrangements mounted to the drawer sidewalls and the frame sidewalls. The applicant considers these existing drawer arrangements to be deficient, since roller bearings do not create a stable and secure travel of the drawer into and out of the frame. Side mounted telescoping slider arrangements allow greater extension of the drawer than is possible with roller bearings, but become unstable at full extension as they are low profile and are only designed to carry load when installed in a vertical orientation. The slider arrangements 102, 104, 106 of the present invention have been found by the applicant to address these shortcomings of existing arrangements.

One or more of the slider arrangements 102, 104, 106 may be adaptable, such that suitable mounting locations on the drawer 28 and frame 12 may be selected to suit a specific installation. This may entail the provision of a plurality of mounting aperture sets provided on both the drawer 28 and frame 12 for mounting the slider arrangements 102, 104, 106, as well as differing slider arrangement lengths, depending of the dimensions of the storage system 10 of a given application. The slider arrangements 102, 104, 106 may be reconfigured and rearranged to provide a new position and more space for insulation and other features and functions between or around the drawer and the frame.

Although not clearly shown one (or more) LEDs or LED strips may be mounted in a suitable location for illuminating the outer surface of the drawer front wall 36 and handle 62. One or more LEDs may also be provided for illuminating the interior of the drawer 28 (FIG. 8). An ON/OFF switch 98 is provided for operating the LEDs. A controller may be provided for automatically switching the LEDs OFF and/or ON, in particular the interior lighting of the drawer 28 when the drawer is open in its first moment of travel, not just when it reaches its final fully opened position.

An air valve (ss FIG. 25) is provided in the frame base 22 to vent air from within the storage system upon closing the drawer 28. This is of assistance when closing the drawer.

Figure 28:
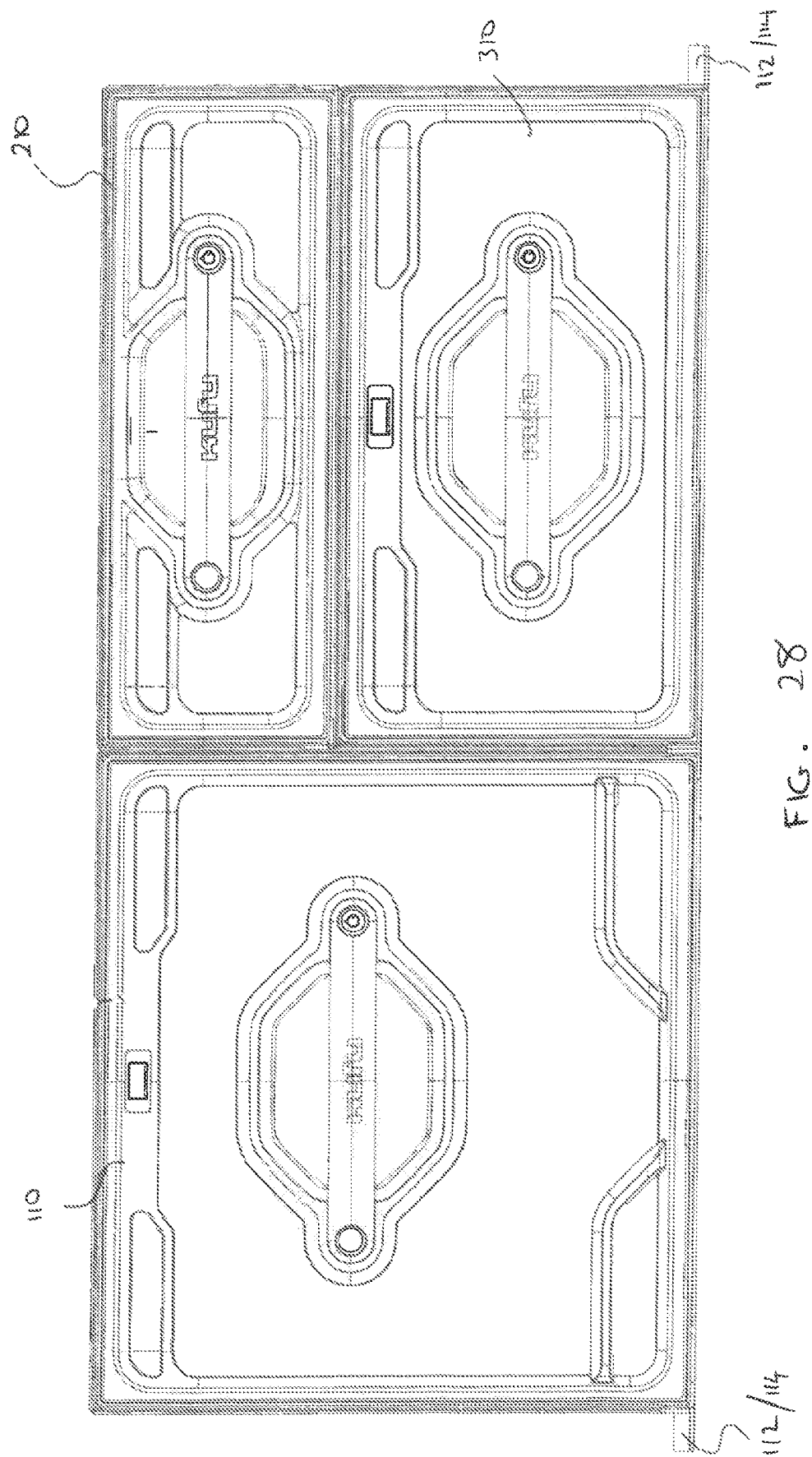
FIG. 28 is a front view of three separate storage systems when assembled together according to second embodiment of the present invention.

Referring to FIG. 28, three storage systems 110, 210 and 310 according to another embodiment of the present invention are shown. Storage systems 110 and 310 are mounted side-by-side and share a common pair of rails 112, 114, while storage system 210 is mounted on top of storage system 310.

FIG. 29 is an isometric view of rails 94, 96 fitted into a desired position extending in a generally parallel orientation across a vehicle cargo space floor.

FIGS. 30 and 31 show a rail and mount assembly suitable for the embodiment shown in FIG. 28. In this embodiment, the rails 194, 196 are secured in position in the rear tray of a ute or 4WD by mounts 200. It can be seen that a third rail 198 is provided, such that an additional storage frame (not shown) or other storage device of a differing dimension can also be received. Rail 198 is mounted in position to longitudinal support members 202 which are, in turn mounted between rails 194, 196.

The storage system 10 may be adapted and reconfigured into a drawer-type fridge. A shorter drawer internal assembly may provide additional room at the forward end of the storage frame 12. It is envisaged that a refrigerating unit would be installed onto brackets and vented out through a forward end capping panel. This could also provide a suitable location for the required power input and other features directly wired to the fridge. An additional panel may be added to the frame 12 to insulate the cooled area from the outer zone of the frame 12. This additional panel can be utilised to mount the cooled elements of the refrigeration unit and a low-profile fan unit to promote airflow throughout the fridge. The internal walls of the cooled zone of the frame 12 would preferably be lined with insulating foam and sealed to prevent airflow or energy transfer. The tub of drawer 28 would likely be mounted slightly higher than in the illustrated drawer embodiments to allow for insulation to line the floor of the inside of the frame 12. Additional width may be created by reconfiguring the sub-assembly of the drawer 28 side walls into a mesh construction that is assembled directly above the drawer 28 tub side edges, allowing more side space for insulation on the inside of the frame 12 sidewall. The mesh construction would allow for greater air flow through the cool zone of the frame 12.

Fridge temperature control and monitoring may be via a modified tactile button arrangement positioned on the drawer handle 62. In this regard, three or four small tactile buttons may be provided to allow the user to turn on and off lights and to control and monitor the temperature of the fridge. Feedback may be provided via a screen panel on a reverse side of the drawer handle 62, shining through the normally opaque outer coating of a clear/transparent drawer handle 62.

The storage system 10 can also adapted and reconfigured into a portable kitchen or workbench, with associated drawer. A flat workbench or cutting board may be mounted to the frame 12. Storage racks and/or a water storage bladder may be incorporated into the system 10, if desired. A water storage bladder may be fluidly connected to a tap and an associated sink provided in the system 10. The tap and sink may have a myriad of possible uses, such as for washing and cleaning items, food preparation, drinking water and hand washing. A sink drain may be provided for directing used water to the ground, or through a filter to a grey water storage bladder.

The frame 12 include wind shields and/or additional work surfaces, each of which may be suitably hinged or otherwise mounted to the frame 12.

Although forms of the invention have been described herein, it will be obvious to those skilled in the art that variations may be made in the construction and relation of parts and method without departing from the spirit and scope of the invention described herein.

A reference herein to a patent document or any other matter identified as prior art, is not to be taken as an admission that the document or other matter was known or that the information it contains was part of the common general knowledge as at the priority date of any of the claims.

What is claimed is:

1. A storage system, comprising:
   a frame, the frame comprising two opposing frame side walls, a frame rear wall, a frame top wall and a frame base, which collectively define a drawer receiving space;
   the frame having a front opening;
   a drawer receivable in the drawer receiving space through the front opening;
   the drawer comprising first and second opposing drawer side walls, a drawer base, a drawer front wall and a drawer rear wall, which collectively define a drawer storage space, the drawer having a top opening for receiving contents into the drawer storage space;
   a drawer position retainer for releasably retaining the drawer in any one of at least two drawer positions relative to the frame, the at least two drawer positions comprising:
      a closed position, wherein the drawer is received within the frame; and
      a partially open position, wherein the drawer is partially received within the frame; and
   an actuator mounted to or adjacent the drawer front wall for manually actuating the drawer position retainer,
      wherein the drawer position retainer is movably mounted to the underside of the drawer base, with the drawer position retainer selectively receivable in a first receiving aperture provided in the frame base for releasably retaining the drawer in the closed position, the drawer position retainer also being selectively receivable in a second receiving aperture provided in the frame base for releasably retaining the drawer in the partially open position.

2. A storage system according to claim 1, comprising an actuating linkage connecting the actuator to the drawer position retainer, the actuating linkage mounted to and extending along an underside of the drawer base.

3. A storage system according to claim 1, comprising a retaining bias that biases the drawer position retainer into a retaining position, such that the drawer position retainer is biased into the first or second aperture when the drawer position retainer is aligned with the respective first or second aperture.

4. A storage system according to claim 3, wherein the drawer position retainer is selectively receivable is in a plurality of additional receiving apertures provided in the frame base, with each additional aperture corresponding to a unique partially open position or a fully open position of the drawer relative to the frame, and wherein the first aperture, second aperture and plurality of additional apertures are provided in the frame base in an aligned orientation that is parallel to the direction of movement of the drawer relative to the frame.

5. A storage system according to claim 1, comprising a drawer handle mounted to the drawer front wall, with the actuator located between the drawer handle and drawer front wall, and the actuator movably mounted to one of the drawer front wall and the drawer handle.

6. A storage system according to claim 5, wherein the actuator is pivotably mounted between the drawer front wall and the drawer handle to one of the drawer front wall and drawer handle.

7. A storage system according to claim 1, comprising a lock for releasably locking the drawer in the closed position.

8. A storage system according to claim 7, wherein the lock is a key lock.

9. A storage system according to claim 1, comprising a first telescoping slider arrangement mounted to the underside of the drawer base and an upper side of the frame base, the first telescoping slider arrangement enabling movement of the drawer relative to the frame between a fully open drawer position and the closed position.

10. A storage system according to claim 9, comprising a second telescoping slider arrangement mounted to the underside of the drawer base and an upper side of the frame base, with the first telescoping slider arrangement mounted to the underside of the drawer base along or proximate to a first side edge of the drawer base, and the second slider arrangement mounted to the underside of the drawer base along or proximate to a second side edge of the drawer base.

11. A storage system according to claim 10, comprising a third telescoping slider arrangement mounted to the underside of the drawer base and an upper side of the frame base, with the third telescoping slider arrangement located between the first and second telescoping slider arrangements.

12. A storage system according to claim 1, when for installation in or to a vehicle, and with the frame for mounting to first and second rails, and the first and second rails for mounting to the vehicle.

13. A storage system according to claim 12, comprising rail mounts for mounting the first and second rails in the rear luggage compartment of a 4WD, SUV, recreation vehicle, commercial vehicle or freight vehicle.

14. A vehicle comprising a storage system according to claim 1, with the storage system mounted in or to the vehicle.

15. A storage system according to claim 5, comprising at least one light mounted to the drawer front wall or drawer handle, the light provided for illuminating at least a portion of an exterior surface of the drawer front wall or drawer handle.

16. A storage system according to claim 15, wherein each light is in the form of an LED or LED strip.

* * * * *